(12) United States Patent
Chang Lee

(10) Patent No.: US 11,188,732 B2
(45) Date of Patent: Nov. 30, 2021

(54) BIOMETRIC ANALYSIS METHOD AND STORAGE MEDIUM

(71) Applicant: SHANGHAI HARVEST INTELLIGENCE TECHNOLOGY CO., LTD, Shanghai (CN)

(72) Inventor: Ya-Ti Chang Lee, Shanghai (CN)

(*) Notice: Subject to any disclaimer, the term of this patent is extended or adjusted under 35 U.S.C. 154(b) by 0 days.

(21) Appl. No.: 16/699,731

(22) Filed: Dec. 1, 2019

(65) Prior Publication Data
US 2020/0175253 A1    Jun. 4, 2020

(30) Foreign Application Priority Data
Nov. 30, 2018 (CN) .......................... 201811457964.3

(51) Int. Cl.
*G06K 9/00* (2006.01)

(52) U.S. Cl.
CPC ..... *G06K 9/00087* (2013.01); *G06K 9/00067* (2013.01); *G06K 9/00026* (2013.01)

(58) Field of Classification Search
None
See application file for complete search history.

(56) References Cited

U.S. PATENT DOCUMENTS

| 2012/0269406 A1* | 10/2012 | Kraemer | G06K 9/00026 382/124 |
| 2016/0232401 A1* | 8/2016 | Hoyos | G06K 9/00107 |
| 2019/0266373 A1* | 8/2019 | Hirokawa | G06T 7/00 |

* cited by examiner

*Primary Examiner* — Joseph R Haley

(57) ABSTRACT

A biometric analysis method and a storage medium are provided. The biometric analysis method includes steps of acquiring a biometric image, acquiring a feature point in the biometric image, and storing descriptors corresponding to the feature point and corresponding relationship between the descriptors and the feature point. The biometric analysis method further includes a step of not storing the biometric image. The above solutions can effectively improve operational efficiency and user experience.

8 Claims, 5 Drawing Sheets

BIOMETRIC ANALYSIS METHOD AND STORAGE MEDIUM

BACKGROUND OF THE INVENTION

Field of the Disclosure

The invention relates to the field of biometric recognition, in particular to a biometric analysis and comparison method that does not depend on image storage.

Description of Related Art

With development of science and technology and advances in technology, touch screen displays have been widely applied in devices with human-computer interaction interfaces, such as operating screens of industrial computers, touch screens of tablet computers and smartphones and the like. Since these devices are often accompanied by a large amount of user information during use, protection for information security is particularly important. Fingerprint recognition encryption is an important one of many information security protection modes.

In the existing fingerprint recognition technology, it is necessary to recognize the entire fingerprint image and then perform the comparison based on the fingerprint as a whole, so the acquisition of the entire fingerprint image is very important. In some existing technologies, there are already means of acquiring a plurality of partial fingerprint images by a lensless fingerprint acquisition structure. For example, in the fingerprint sensor we designed, it is possible to acquire multiple partial imaging results of a single fingerprint simultaneously through the multi-cell structure under the screen. In the operation of analyzing by using the imaging results, one method is to perform removing duplicates, supplementation, interpolation, stitching, and the like by a complicated algorithm to restore an entire fingerprint image. Then through comparing the entire fingerprint image, fingerprint recognition is achieved. However, in some aspects, if the fingerprint can be directly compared through partial fingerprint images, the efficiency of fingerprint recognition based on the multi-part fingerprint device will be effectively improved.

In summary, it is particularly necessary to provide a method for raising the speed of recognizing and analyzing in an environment of inputting multiple partial fingerprint images and improving the user experience of the under-screen fingerprint recognition device.

SUMMARY OF THE INVENTION

Therefore, it is necessary to provide a biometric analysis method, including the following steps of acquiring a biometric image, acquiring a feature point in the biometric image, and storing descriptors corresponding to the feature point and corresponding relationship between the descriptors and the feature point.

Specifically, the method further includes a step of not storing the biometric image.

In addition, the method further includes steps of detecting a user's biometric input action, receiving the biometric image that the user inputs, obtaining all feature points in the biometric image, determining whether there is a new feature point, and determining whether a preset number of input times is reached.

Specifically, the method further includes following steps of, there is no new feature point, displaying the prompt information so that the user inputs a fingerprint by changing an inputting angle;

when it is determined that the preset number of input times is not reached or new feature points are detected, storing the new feature points and corresponding descriptors of the new feature points;

when it is determined that the preset number of input times has been reached, displaying the fingerprint entry success prompt information;

when there are three consecutive inputs and no new feature points, displaying the fingerprint entry success prompt information.

In a preferred embodiment, when a biometric feature comparison is required, descriptors of feature points corresponding to a first biometric feature are obtained and compared to descriptors of feature points corresponding to a second biometric feature one by one; when the difference between the two descriptors is less than a difference threshold, it is determined that the feature points are matched; when a number of matching feature points exceeds a preset value, it is determined that the first biometric feature matches the second biometric feature.

A biometric analysis storage medium storing a computer program, the computer program, when being executed, includes following steps: acquiring a biometric image, acquiring a feature point in the biometric image, and storing descriptors corresponding to the feature point and corresponding relationship between the descriptors and the feature point.

In addition, the computer program, when being executed, comprises a step of not storing the biometric image.

Specifically, the computer program, when being executed, includes steps of detecting a user's biometric input action, receiving the biometric image that the user inputs, obtaining all feature points in the biometric image, determining whether there is a new feature point, and determining whether a preset number of input times is reached.

Specifically, the computer program, when being executed, further includes following steps of, when it is determined that the preset number of input times has not been reached and there is no new feature point, displaying the prompt information so that the user inputs a fingerprint by changing an inputting angle;

when it is determined that the preset number of input times is not reached or new feature points are detected, storing the new feature points and corresponding descriptors of the new feature points;

when it is determined that the preset number of input times has been reached, displaying the fingerprint entry success prompt information;

when there are three consecutive inputs and no new feature points, displaying the fingerprint entry success prompt information.

In an optional embodiments, when a biometric feature comparison is required, descriptors of feature points corresponding to a first biometric feature are obtained and compared to descriptors of feature points corresponding to a second biometric feature one by one; when the difference between the two descriptors is less than a difference threshold, it is determined that the feature points are matched; when a number of matching feature points exceeds a preset value, it is determined that the first biometric feature matches the second biometric feature.

Different from the prior art, the biometric analysis method involved in the above technical solution only needs to directly analyze the feature points in the analysis of partial fingerprint images. The feature points have the same representation in both the partial image and the overall fingerprint image. Therefore, recording only the feature points and their corresponding descriptors can achieve the purpose of establishing the correspondence between the partial fingerprint image and the entire specific fingerprint. Converting feature points in several partial fingerprint images of the same fingerprint into descriptors for storage, can effectively reduce the workload of fingerprint feature recognition, reduce the requirement of the lens, and omit the image processing steps such as stitching, rotation, interpolation, etc., improving the efficiency of biometric analysis.

BRIEF DESCRIPTION OF THE DRAWINGS

The present invention is further described in detail below with reference to the accompanying drawings and specific embodiments.

DESCRIPTION OF THE INVENTION

Technical contents, structural features, implemented objectives and effects of the present invention will be described in detail below in combination with embodiments and with reference to the accompanying drawings.

Figure 1:
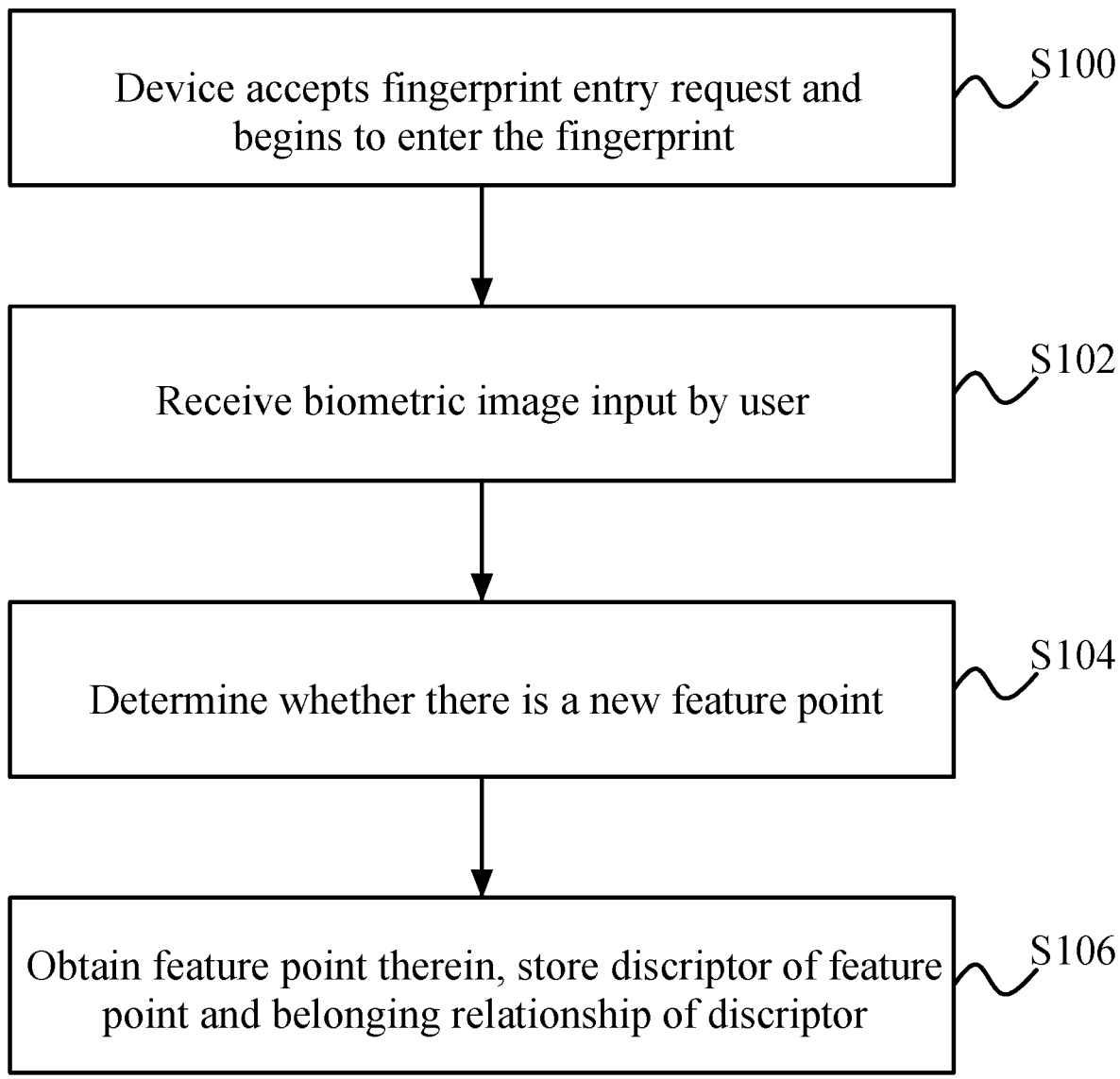
FIG. 1 is a flow chart of a biometric analysis method according to an embodiment of the present invention.
Figure 2:
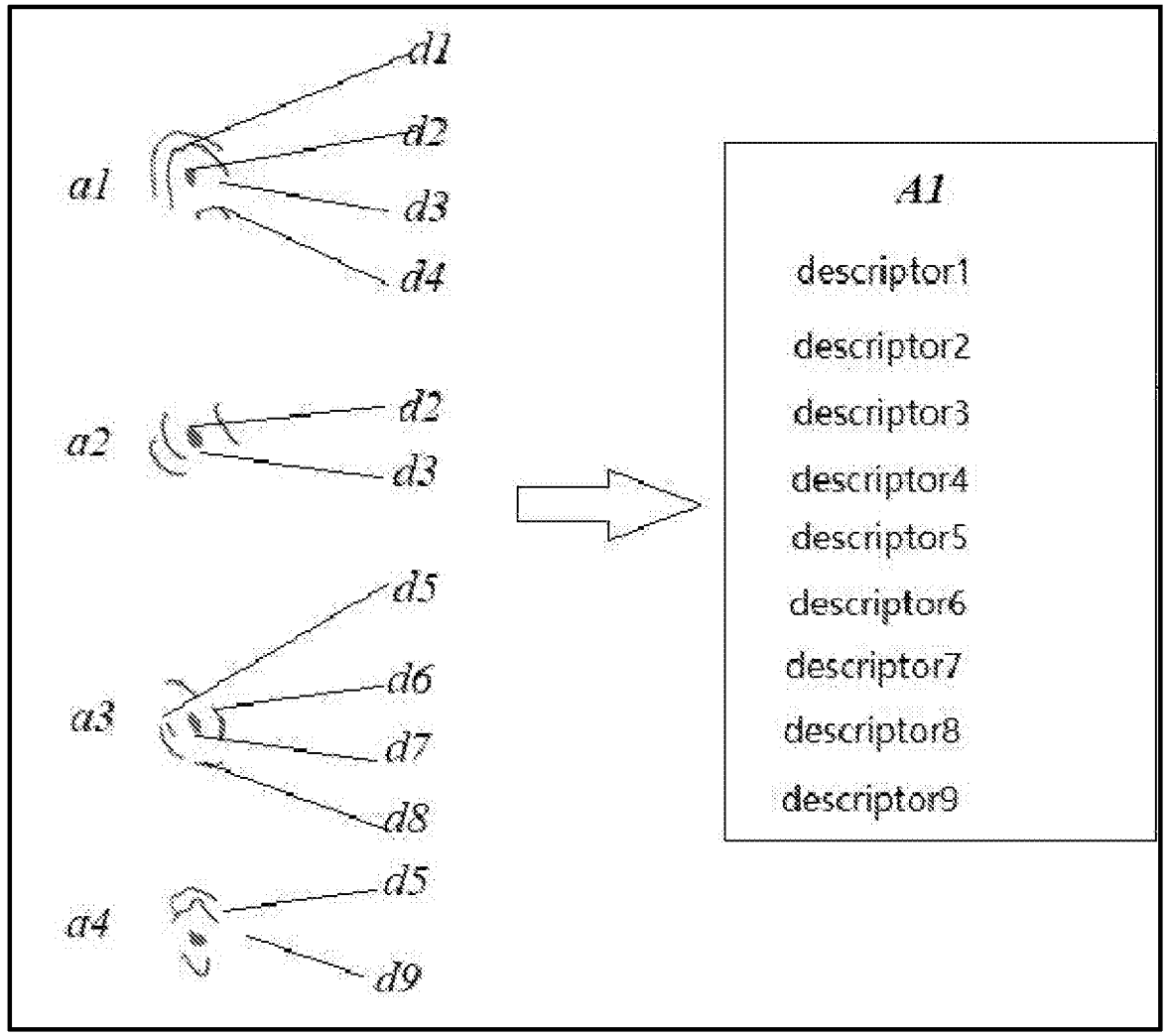
FIG. 2 is a schematic diagram of acquiring and recording descriptors according to an embodiment of the invention.

As shown in FIG. 1, which includes a biometric analysis method. The biometric analysis method may start from the step S102 by acquiring the biometric image, and then perform the step S106 to acquire feature points therein, and store the descriptors and associated relationships corresponding to the feature points. Here, the biometric feature is such as fingerprint. However, if the fingerprint is replaced with a biometric pattern such as palm print, foot print, toe print, retina, iris, etc., it can be realized by simple replacement. The feature point here refers to a prominent point which can reflect the algorithm relationship between a pixel point and a surrounding pixel point in the image obtained by an image analysis method. The image analysis method may be an ORB algorithm or an equivalent feature extraction algorithm such as SIFT, SURF, KAZE, AKAZE, and BRISK. Here we take the ORB algorithm as an example, the feature is FAST feature, and each feature point has its descriptor. Then, each time a fingerprint image is input, the feature points thereof are directly obtained by the ORB algorithm. According to the characteristics of the algorithm, the descriptor is a multi-dimensional vector, and the dimension may be 64, 128 or 256. In our example, 128-dimension is used for explanation. From the embodiment shown in FIG. 2, we see that the partial fingerprint images a1, a2, a3, and a4 input in the same batch and belonged to the same fingerprint A1, a1 includes descriptors d1, d3, d4; a2 includes descriptors d2, d3; a3 includes descriptors d5, d6, d7, d8; a4 includes descriptors d5, d9. In the embodiment, d3 appears in both partial fingerprint images a1, a2 and d5 appears in both partial fingerprint images a3, a4, so the effective descriptors of the fingerprint A1 are only d1, d2, d3, d4, d5, d6, d7, d8, d9. These descriptors are stored and their belonging relationships as belonging to the same fingerprint A1 are recorded. The storage format may be [A1, d1, d2, d3, d4, d5, d6, d7, d8, d9]. It is not necessary to store the partial fingerprint images a1, a2, a3, a4 because they are intermediate products and have been analyzed. In a preferred embodiment, we do not store partial fingerprint images. The biometric analysis method involved in the above technical solution only needs to directly analyze the feature points in the partial fingerprint image analysis. The feature points obtained by the feature algorithm in the partial fingerprint images and the entire fingerprint image are the same. Therefore, only the feature points and their corresponding descriptors are recorded, and the correspondence between the partial fingerprint images and the entire fingerprint will be established. Converting the feature points of several partial fingerprint images of the same fingerprint into the descriptors for storage, can effectively save the workload of fingerprint feature recognition and reduce the lens devices needed to obtain the entire fingerprint image. In addition, there is no need to image processing steps such as splicing, rotation, interpolation, etc. as usual to synthesize a multiple partial fingerprints into the entire fingerprint image, thereby achieving the technical effect of improving the efficiency of biometric analysis.

In some further embodiments shown in FIG. 1, for the biometric analysis method in which only the descriptors are stored, the following fingerprint entry steps are also designed. In step S100, the device accepts the fingerprint entry request and begins to enter the fingerprint. A user's biometric input action is detected, and if detected, start step S102 of receiving biometric image that the user input. Due to the problem of the contact surface, the input image can be regarded as a partial fingerprint image. Step S104 is further performed to detect all feature points in the partial fingerprint image, determine whether there is a new feature point, and determine whether the preset number of input times is reached. When it is detected that there is a new feature point, step S106 is performed to store the descriptor corresponding to the new feature point and the belonging relationship of the descriptor. If the current fingerprint number is A2, the detected descriptor is stored together with the fingerprint number A2. Through this biometric feature input method, we can simplify the information that needs to be stored during the entry step. The biometric image recorded in the entry and storage stages is simplified into several descriptors for storage, and it is not necessary of storing image information in the process, firstly reducing the required storage space, and secondly, further avoiding the image information being stolen by others, further improving the security of data storage.

Figure 3:
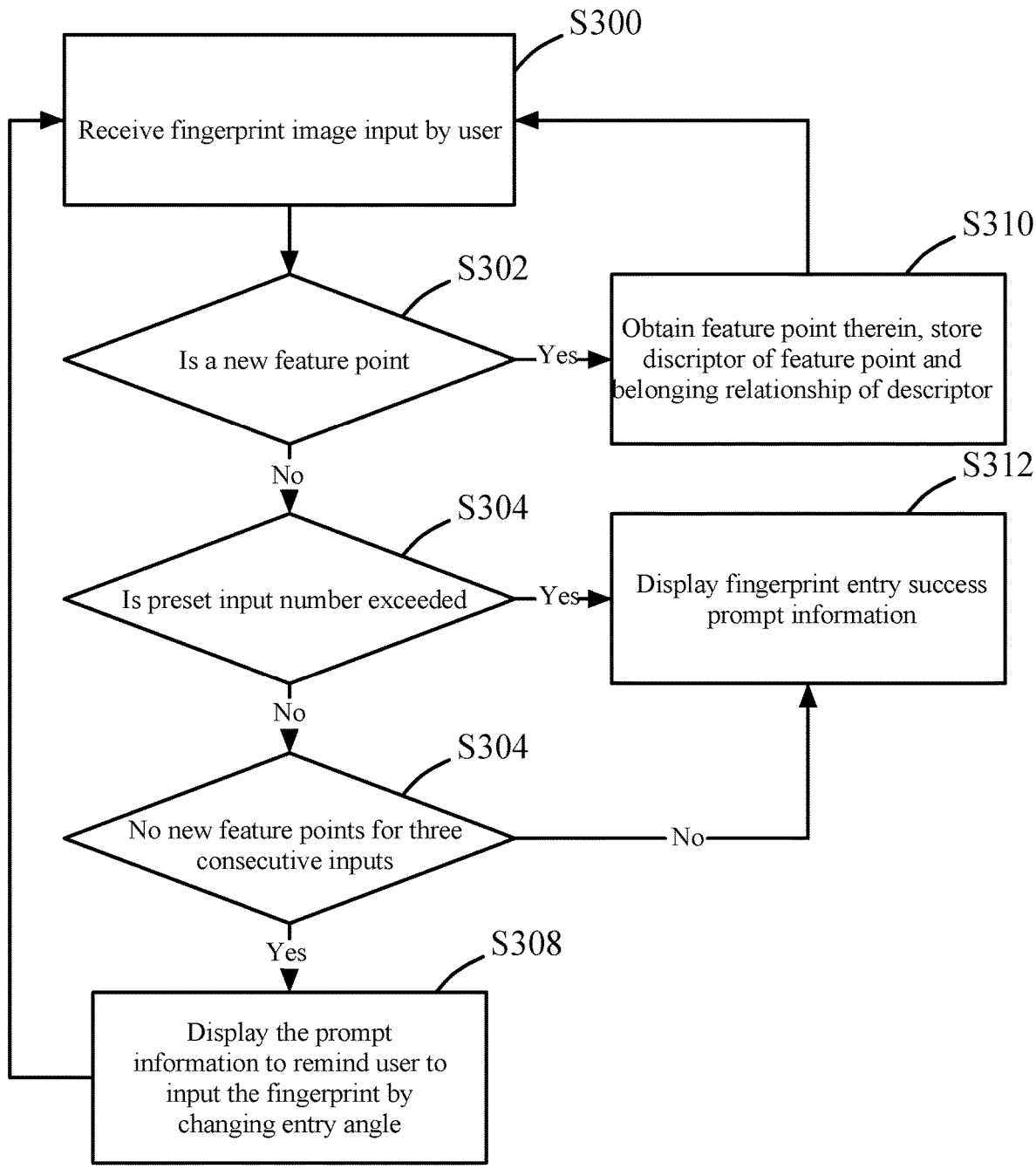
FIG. 3 is a flowchart of fingerprint entry according to an embodiment of the present invention.

In the specific embodiment shown in FIG. 3, in order to better save resources during the entry step and enhance the user experience, the invention also performs the following steps. Taking entry fingerprint as an example, the following steps are described. In the step S300, the input of fingerprint image of the user is received, and in the step S302 whether there is a new feature point is determined; in the step S304 whether the preset number of input times is exceeded is determined; and in the step S306 whether there are no new feature points for three consecutive inputs is determined. Then follow the logic below.

When it is determined that the preset number of input times has not been reached and there is no new feature point, it indicates that the user may continuously input the fingerprint at a specific angle and needs to be correctly guided. Therefore, step S308 is performed to display the prompt information, so that the user inputs the fingerprint by changing the entry angle. It is also possible to determine whether there is no new feature point for three consecutive times, and then proceed to step S308.

When it is determined that the preset number of input times is not reached or new feature point is detected, the step S310 is performed to store the newly added feature point and the corresponding descriptor according to the above-mentioned method for subsequent fingerprint comparison.

When it is determined that the number of the descriptors once received reaches the threshold, the fingerprint input may be considered to be complete, and the step S312 is performed to display the fingerprint entry success prompt information. The threshold here can be set according to experience, considering the commonality of people's textures, it can be set to 20. Or when it is determined that the preset number of input times is reached, it can be considered that the number of the available descriptors of the user's fingerprint may not reach the effective number 20, i.e. the number of the descriptors of the normal person's texture, and the input number threshold is set to 10. If the input is 10 times and the effective descriptor still does not satisfy 20, the fingerprint is considered to have been completely entered, and the fingerprint entry success prompt information is still displayed in the step S312. In the input process, when there are three consecutive inputs and no new feature points, it means that the user may try all entry angles as far as possible and there is no way to input more descriptors, then it can be determined that the fingerprint has been completely entered. The step S312 is also performed to display the fingerprint entry success prompt information.

Figure 4:
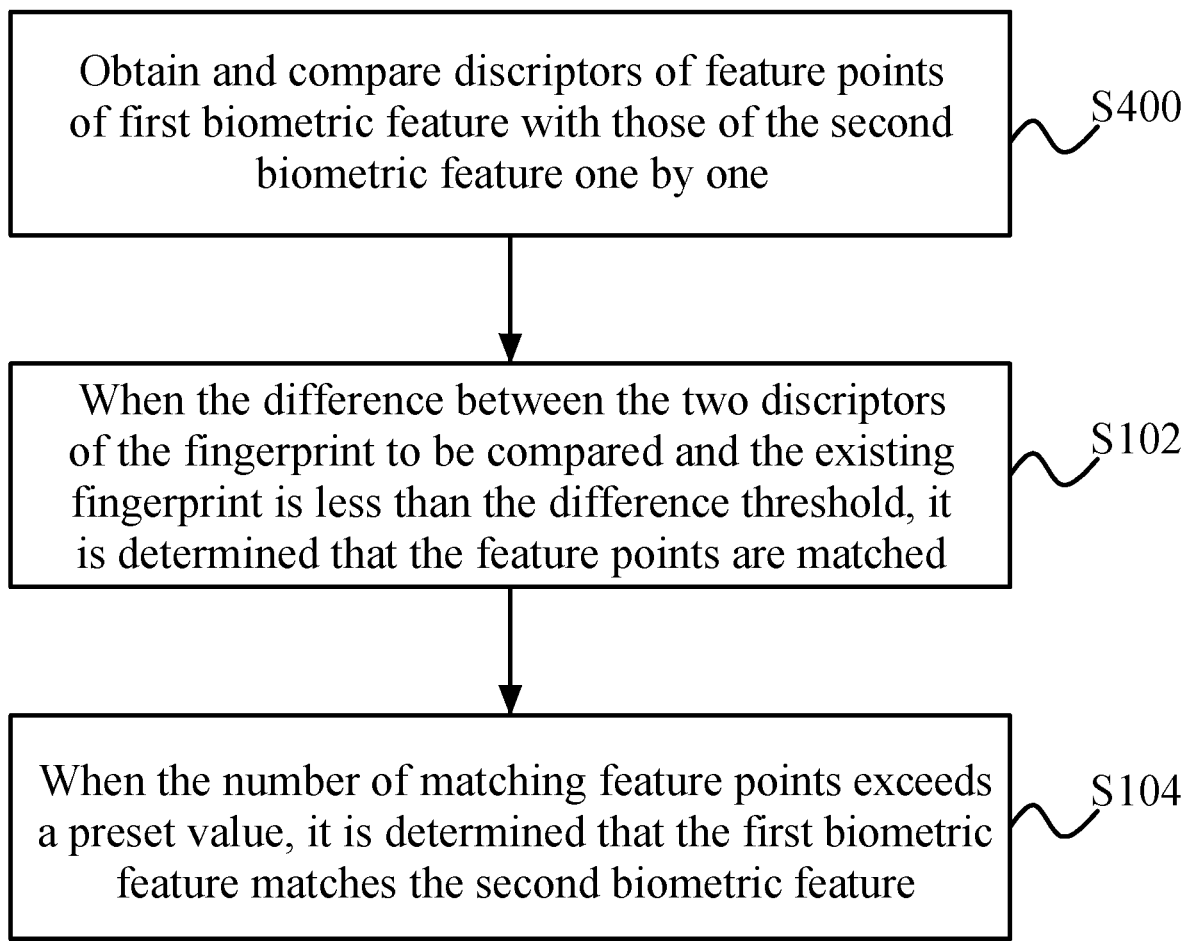
FIG. 4 is a flowchart of feature points matching method according to an embodiment of the present invention.

In the embodiment shown in FIG. 4, the solution of the present invention also performs the comparison steps by the following method. When the biometric feature comparison is required, the step S400 is performed to obtain the descriptors of the feature points corresponding to the first biometric feature and compare those with the descriptors of feature points corresponding to the second biometric feature one by one. Here, the first biometric feature is a fingerprint feature to be compared, and the second biometric feature is an existing fingerprint feature in the stored fingerprint library. When the user places a finger on the fingerprint acquiring device, the fingerprint acquiring device directly acquires the fingerprint information, and uses the above feature algorithm to calculate the descriptors of the fingerprint to be compared, and compare these descriptors with the descriptors of existing fingerprint features. When the difference between the two descriptors of the fingerprint to be compared and the existing fingerprint is less than the difference threshold, it is determined that the feature points are matched (as shown in step S402). When the number of matching feature points exceeds a preset value, it is determined that the first biometric feature matches the second biometric feature (as shown in step S404).

Figure 5:
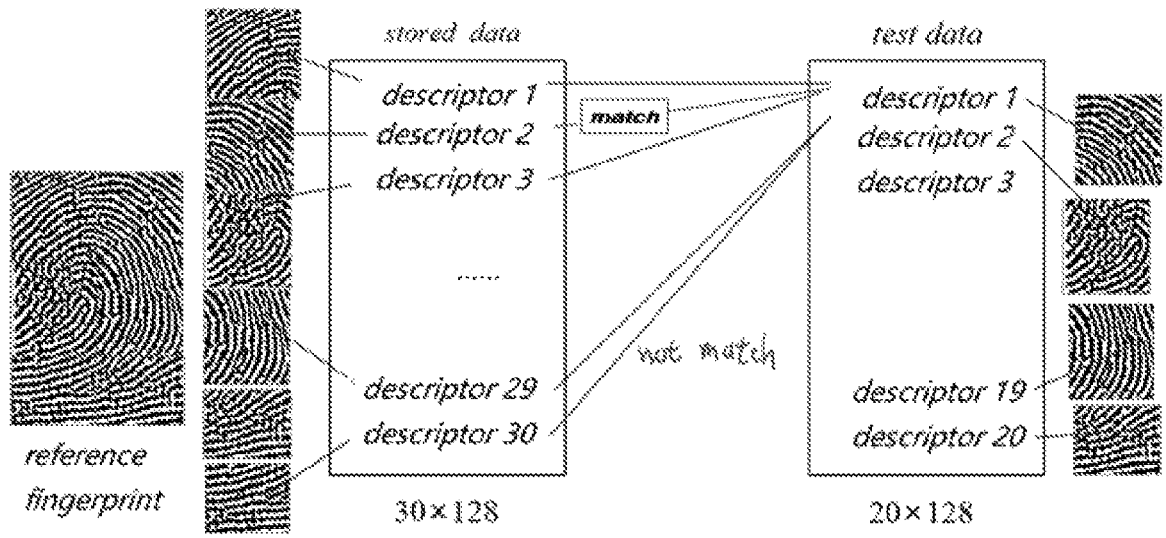
FIG. 5 is a schematic diagram of a specific operation of feature points matching according to an embodiment of the present invention.

An example of a fingerprint comparison is shown in the embodiment shown in FIG. 5. If 5 feature points can be taken out from a partial fingerprint image and a total of 6 partial fingerprint images is used for registration, a total of 30 feature points are stored when registering and stored as a matrix of 30×128. That is, there are 30 feature points in the existing fingerprint stored in stored data, which are stored as a representation of a matrix of 30×128. In the comparison stage, it is assumed that 4 partial fingerprint images will be obtained, and 20 feature points are obtained, and each of the 20 feature points is compared with 30 feature points in the template. If the distance between two vectors is less than 1, it means that the feature points match. For example, if the second feature point of the existing fingerprint in the figure matches the first feature point of the fingerprint to be compared, it is determined that one feature point matches. Then, among the 20 feature points, 18 feature points can be matched, and it is considered to be the same fingerprint. Through the above examples, the solution of the present invention achieves verification.

A biometric analysis storage medium storing a computer program is provided. The computer program, when being executed, includes the following steps: acquiring a biometric image, acquiring a feature point therein, and storing the descriptor and the corresponding relationship between the descriptors and the feature point.

In a further embodiment, the computer program, when executed, further includes a step of not storing corresponding image information.

In a specific embodiment, the computer program, when executed, further includes the following steps of detecting the user's biometric input action, receiving biometric image that the user input, obtaining all feature points in the input image, determining whether there is a new feature point, and determining whether the preset number of input times is reached.

In a specific embodiment, the method further includes the following steps.

When it is determined that the preset number of input times has not been reached and there is no new feature point, the prompt information is displayed so that the user inputs the fingerprint by changing the angle;

When it is determined that the preset number of input times is not reached or new feature points are detected, the newly added feature points and the corresponding descriptors are stored;

When it is determined that the preset number of input times has been reached, the fingerprint entry success prompt information is displayed;

When there are three consecutive inputs and no new feature points, the fingerprint entry success prompt information is displayed.

In other optional embodiments, when the biometric feature comparison is required, the descriptors of the feature points corresponding to the first biometric feature are obtained and compared to descriptors of feature points corresponding to a second biometric feature one by one. When the difference between the two descriptors is less than a difference threshold, it is determined that the feature points are matched. When the number of matching feature points exceeds a preset value, it is determined that the first biometric feature matches the second biometric feature.

Although the above embodiments have been described, those skilled in the art can make other changes and modifications to these embodiments once they have learned the basic inventive concept. Therefore, the above descriptions are only the embodiments of the present invention, and thus does not limit the patent protective scope of the present invention. Similarly, any equivalent structure or equivalent process transformation made by using the present specification and the drawings, or directly or indirectly applied to other relevant technical fields, shall be included in the patent protective scope of the present invention.

What is claimed is:

1. A biometric analysis method, comprising steps of acquiring a biometric image, acquiring a feature point in the biometric image, and storing descriptors corresponding to the feature point and corresponding relationship between the descriptors and the feature point, and not storing the biometric image; and detecting a user's biometric input action, receiving the biometric image that the user inputs, obtaining all feature points in the biometric image, determining whether there is a new feature point, and determining whether a preset number of input times is reached.

2. The biometric analysis method according to claim 1, further comprising steps of, when it is determined that the preset number of input times has not been reached and there is no new feature point, displaying the prompt information so that the user inputs a fingerprint by changing an inputting angle;

when it is determined that the preset number of input times is not reached or new feature points are detected, storing the new feature points and corresponding descriptors of the new feature points;

when it is determined that the preset number of input times has been reached, displaying the fingerprint entry success prompt information;

when there are three consecutive inputs and no new feature points, displaying the fingerprint entry success prompt information.

3. The biometric analysis method according to claim 1, characterized in that, when a biometric feature comparison is required, descriptors of feature points corresponding to a first biometric feature are obtained and compared to descriptors of feature points corresponding to a second biometric feature one by one; when the difference between the two descriptors is less than a difference threshold, it is determined that the feature points are matched; when a number of matching feature points exceeds a preset value, it is determined that the first biometric feature matches the second biometric feature.

4. A biometric analysis storage device storing a computer program, the computer program, when being executed, comprising following steps: acquiring a biometric image, acquiring a feature point in the biometric image, and storing descriptors corresponding to the feature point and corresponding relationship between the descriptors and the feature point, and not storing the biometric image;

wherein the computer program, when being executed, comprises steps of detecting a user's biometric input action, receiving the biometric image that the user inputs, obtaining all feature points in the biometric image, determining whether there is a new feature point, and determining whether a preset number of input times is reached.

5. The biometric analysis storage device according to claim 4, characterized in that, the computer program, when being executed, comprises steps of, when it is determined that the preset number of input times has not been reached and there is no new feature point, displaying the prompt information so that the user inputs a fingerprint by changing an inputting angle;

when it is determined that the preset number of input times is not reached or new feature points are detected, storing the new feature points and corresponding descriptors of the new feature points;

when it is determined that the preset number of input times has been reached, displaying the fingerprint entry success prompt information;

when there are three consecutive inputs and no new feature points, displaying the fingerprint entry success prompt information.

6. The biometric analysis storage device according to claim 4, characterized in that, the computer program, when being executed, comprises following steps:

when a biometric feature comparison is required, descriptors of feature points corresponding to a first biometric feature are obtained and compared to descriptors of feature points corresponding to a second biometric feature one by one; when the difference between the two descriptors is less than a difference threshold, it is determined that the feature points are matched; when a number of matching feature points exceeds a preset value, it is determined that the first biometric feature matches the second biometric feature.

7. The biometric analysis method according to claim 1, characterized in that, steps of storing descriptors corresponding to the feature point and corresponding relationship between the descriptors and the feature point, further comprises steps of converting the feature points of multiple partial fingerprint images of the same fingerprint into the descriptors for storage, and recording a belonging relationship that those descriptors belong to the same fingerprint.

8. The biometric analysis storage device according to claim 4, characterized in that, steps of storing descriptors corresponding to the feature point and corresponding relationship between the descriptors and the feature point, further comprises steps of converting the feature points of multiple partial fingerprint images of the same fingerprint into the descriptors for storage, and recording a belonging relationship that those descriptors belong to the same fingerprint.

\* \* \* \* \*